Figure 1:
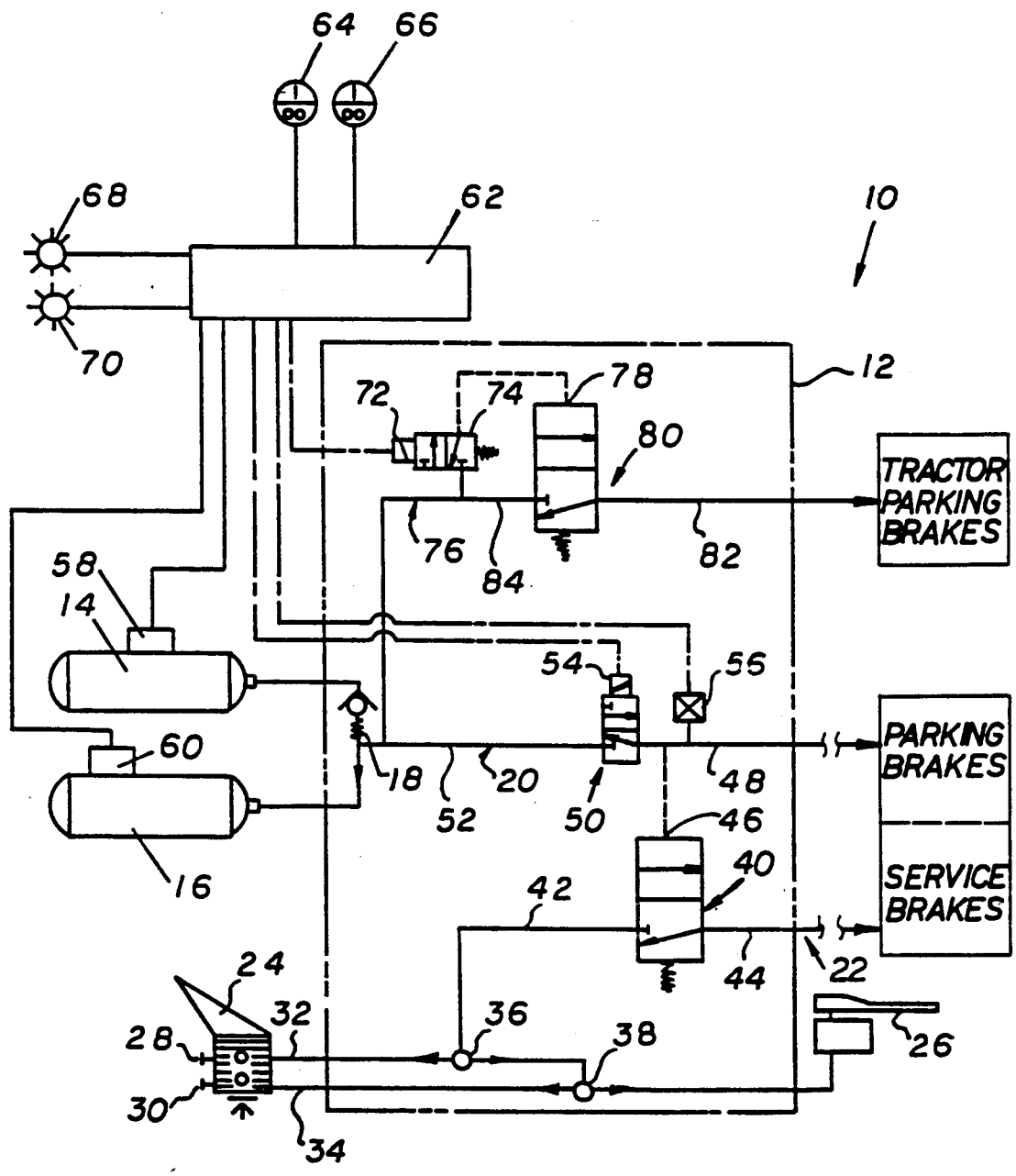

United States Patent [19]

Cramer et al.

[11] Patent Number: 5,061,015
[45] Date of Patent: Oct. 29, 1991

[54] TRACTOR PROTECTION CONTROL SYSTEM

[75] Inventors: Kenneth L. Cramer, Jamestown, N.Y.; Jeffrey J. Krause, Westlake, Ohio

[73] Assignee: Allied-Signal Inc., Morristown, N.J.

[21] Appl. No.: 508,766

[22] Filed: Apr. 12, 1990

[51] Int. Cl.⁵ .................. B60T 13/00; B60T 13/38; B60T 15/00
[52] U.S. Cl. ............................... 303/7; 303/9; 303/15; 303/9.76
[58] Field of Search ............... 303/3, 7, 9, 15, 9.76, 303/71

[56] References Cited

U.S. PATENT DOCUMENTS

| | | | |
|---|---|---|---|
| 2,859,763 | 12/1990 | Fites | 303/8 |
| 3,866,623 | 12/1990 | Klimek | 137/102 |
| 4,550,953 | 11/1985 | Bartholomew | |
| 4,671,578 | 12/1990 | Rothen et al. | 303/15 |
| 4,763,959 | 8/1988 | Vandemotter | 303/7 X |

Primary Examiner—Robert J. Oberleitner
Assistant Examiner—Christopher Schwartz
Attorney, Agent, or Firm—Ken C. Decker; William N. Antonis

[57] ABSTRACT

An electropneumatic subsystem of a vehicle compressed air braking system controls communication within the trailer control line, the trailer supply line, and the tractor spring brake delivery line. A valve operated by pilot pressure is installed in the trailer control line, and responds to the pressure level in the trailer supply line to open or close the trailer control line in accordance therewith, thereby providing a tractor protection function. A solenoid valve in the trailer supply line is actuated by an electronic control unit to open and close the trailer supply line to thereby perform a trailer spring brake control function and tractor protection function.

2 Claims, 1 Drawing Sheet

TRACTOR PROTECTION CONTROL SYSTEM

This invention relates to a control subsystem mechanism for a fluid pressure braking system.

Existing fluid pressure braking systems for tractor-trailer combination vehicles require rather complicated pneumatic control systems to supply fluid pressure to the trailer (releasing the trailer spring brakes) and to provide a service brake control signal to effect a trailer brake application. Such braking systems also require a tractor protection valve which operates automatically when the trailer is disconnected from the tractor (either when the trailer is intentionally decoupled from the tractor or during trailer breakaway) to protect the tractor braking systems. Such trailer supply and tractor protection subsystems have heretofore required complicated pneumatic plumbing in the restricted under-dash portion of the vehicle. More recently, it has been proposed in U.S. Pat. No. 4,763,959, to provide an electropneumatic subsystem to control tractor spring brake and trailer supply functions. Such electropneumatic subsystems permit removal of the complicated pneumatic plumbing in the crowded under-dash area, and replace the pneumatic connections with electronic controls and electrical connections. The present invention is a further improvement of the electropneumatic subsystem disclosed in the aforementioned U.S. Pat. No. 4,763,959 in that the present invention also incorporates the tractor protection function in the electropneumatic subsystem which controls the tractor spring brake and trailer supply functions.

These and other advantages of the present invention will become apparent from the following description, with reference to the accompanying drawing, the sole FIGURE of which is a schematic illustration of a electropneumatic braking subsystem made pursuant to the teachings of the present invention.

Referring now to the drawing, an electropneumatic braking subsystem generally indicated by the numeral 10 includes a manifold 12 within which are located pneumatic and electropneumatic control valves as will hereinafter be described. A pair of reservoirs 14, 16 are charged by the vehicle engine driven air compressor (not shown) in a manner well known to those skilled in the art. The reservoirs 14, 16 are connected through a biasing check valve 18 to the trailer supply line 20. Biasing check valve 18 normally closes off the reservoir 14 and permits communication only through the reservoir 16, but permits communication from the reservoir 14 and closes off the reservoir 16 when the pressure level in the reservoir 14 exceeds that of the reservoir 16 by more than a predetermined amount.

Trailer supply line 20 supplies hold-off pressure to conventional spring brake actuators (not shown) on the trailer portion of a tractor-trailer combination vehicle and charges the trailer reservoirs with compressed air used to effect trailer service brake applications. The manifold 12, as well as the pressure reservoirs 14 and 16 and the other components illustrated in the FIGURE, are carried on the tractor portion of the tractor-trailer combination vehicle.

Trailer service brake actuations are controlled by pressure signals transmitted through trailer service or control line 22. Accordingly, the trailer supply line 20 and trailer service line 22 interconnect the braking systems on the tractor and trailer portions of the vehicle. The pressure signals communicated through trailer control line 22 are generated either from a conventional dual circuit foot brake valve generally indicated by the numeral 24, or by a trailer hand control valve 26. The dual circuits are supplied by the separate reservoirs 14, 16 and are connected through inlets 28, 30 of the dual brake valve 24. When the dual brake valve 24 is actuated by the vehicle operator, the inlets 28, 30 are simultaneously communicated to corresponding outlets 32, 34. These outlets, although the connections are not shown in the drawing, are connected to the service brakes of the tractor portion of the vehicle (not shown) to effect a tractor service brake application. The outlet of the hand brake valve 26, which is connected to one of the service reservoirs 14, 16, and the dual circuits controlled by the valve 24, are connected through double check valve 36, 38 to the trailer service or control line 22. The double check valves 36, 38 assure that only the highest of the output of the hand brake valve 26 or the pressures at the outlets 32, 34 of brake valve 24 are communicated to the trailer control line 22.

A pressure control valve generally indicated by the numeral 40 is biased to the position illustrated in the drawing in which the upstream portion 42 of the trailer control line 22 is closed off, and the portion 44 of the trailer control line 22 downstream from the control valve 40 is vented to atmosphere. The valve 40 responds to pilot pressure communicated to pilot control port 46 to shift to its alternate position in which the upstream portion 42 is communicated to the downstream portion 44. When the pilot pressure at port 46 is vented, the valve 40 is biased to the position illustrated in the drawing. The pilot pressure port 46 is communicated with portion 48 of the trailer supply line 20 downstream from a solenoid actuated pneumatic valve generally indicated by the numeral 50, which divides the supply line 20 into the downstream portion 48 and an upstream portion 52 which is communicated to the reservoirs 14, 16. The valve 50 is biased toward the position illustrated in which the downstream portion 48 is vented to atmosphere and the upstream portion 52 is shut off. Valve 50 includes a solenoid actuator 54 which, when energized, actuates valve 50 to the actuated position in which the upstream portion 52 is communicated to the downstream portion 48.

A pressure sensor 56 measures the pressure in the downstream portion 48 of trailer supply line 20. Pressure sensors 58, 60 measure the pressure levels in the reservoirs 14, 16. Each of the pressure sensors 56, 58, and 60 generate pressure signals which vary as a function of the corresponding pressure measured. These pressure signals are transmitted to input terminals of an electronic control unit 62. Electronic control unit 62 includes a microprocessor which is programmed according to the teachings of the aforementioned U.S. Pat. No. 4,763,959. Electronic control unit 62 also receives inputs from operator actuated, dash-mounted, trailer charge button 64 and another dash-mounted, operator actuated system park button 66. The purpose of the buttons 64 and 66 will hereinafter be described. Visual indicating lights 68, 70 are also mounted on the vehicle dashboard and inform the vehicle operator of the condition of the braking system, as will also hereinafter be described.

The electronic control unit 62 includes output terminals which are connected to the solenoid 54 which operates the valve 50 and also to a solenoid 72 which operates a solenoid actuated valve 74 which is substantially identical to the solenoid valve 50. Valve 74 is connected between a tractor spring brake delivery line 76, which is communicated to the outlet of the biasing check valve 18, and a pilot pressure port 78 of a pilot pressure operated control valve generally indicated by the numeral 80, which controls communication through the tractor spring brake delivery line 76. The pilot pressure operated valve 80 is biased toward the position illustrated in the drawing in which the downstream portion 82 of the tractor spring brake delivery line 76 is vented to atmosphere, and the upstream portion 84 of the delivery line 76 is shut off. The solenoid operated valve 74 is normally biased to the position in which the pilot pressure port 78 is vented. However, when a signal generated by electronic control unit 62 is transmitted to the solenoid 72, the valve 74 shifts to the position in which pressure is communicated from the tractor spring brake delivery line 76 to the pilot pressure port 78 of valve 80. Valve 80 responds to pilot pressure at pilot pressure port 78 to shift to the actuated position and when the upstream and downstream portions 84, 82 of tractor spring brake delivery line are communicated to one another, to thereby communicate pressure to the tractor spring brakes.

In operation, the various valves are illustrated in the FIGURE in the positions which they assume when the vehicle is parked. In this condition, the downstream portion 82 of the tractor spring brake delivery line 76 is vented, so that the tractor spring brakes are applied. Similarly, the downstream portion 48 of trailer supply line 20 is also vented, so that the trailer spring brakes are applied. Since portion 48 is vented, trailer control line 22 is also shut off. Both of the indicator lamps 68, 70 will be extinguished.

When the vehicle is to be moved, the vehicle operator operates trailer tractor charge push button 64, which actuates valve 74 to supply pilot pressure to the valve 80, actuating the latter to thereby supply hold-off pressure to effect release of the tractor spring brakes. At that time, indicator lamp 68 is illuminated. The vehicle operator then pushes system park push button 66, which operates valve 50 to communicated pressure through trailer supply line 20, thereby effecting release of the trailer spring brakes. At that time, indicator lamp 70 is actuated. Communication of pressure through trailer supply line 20 also communicates pressure to pilot port 46 of valve 40, actuating the latter so that pressure signals can be transmitted through trailer control line 22, so that operation of the hand control valve 26 or the foot valve 24 will effect a service brake actuation. Although not shown on the drawing, the foot brake valve 24 also controls communication of fluid pressure to the tractor service brakes. As described in the aforementioned U.S. Pat. No. 4,763,959, operation of the system park button 66, because of the programming of the microprocessor within electronic control module 62, simultaneously deactuates solenoids 54 and 72, so that the parking brakes are applied by both the tractor and trailer. However, if the trailer is to be unhooked from the tractor and the tractor is operated in the bobtail mode, push button 64 can then be actuated, thereby actuating valve 74 to actuate valve 80, thereby supplying hold-off pressure to the tractor spring brakes.

When the system park button 66 is operated, both the indicating lights 70 and 68 are extinguished, but when the tractor is to be operated in the bobtail mode by again operating the switch 64, light 68 is illuminated. During operation in the bobtail mode, valve 50 remains in the position illustrated in which the downstream portion 48 of trailer supply line 20 is vented, thereby venting the pilot pressure port 46 of valve 40. Accordingly, valve 40 is caused to shut off the trailer control line 22 and, because the valve 50 is not actuated, the trailer supply line is also shut off. Accordingly, operation of the foot valve 24 will actuate only the tractor service brakes, and, since the control line 22 is shut off, operation of the valve 24 will not blow compressed air out of the open trailer control line 22. Since both of the trailer control line 22 and trailer supply line 20 are shut off during operation in the bobtail mode, the valves 40 and 50 provide the tractor protection function normally provided by a separate prior art valve in prior art exclusively pneumatic systems, as well known to those skilled in the art.

The braking system 10 is protected against trailer breakaway by the pressure sensor 56. The logic stored within the microprocessor of electronic control unit 62 responds to a signal from pressure sensor 56 indicating a loss of pressure in the downstream portion 48 of trailer supply line 20 while the valve 50 is actuated, which occurs during trailer breakaway or, for example, when the vehicle operators forgets or improperly connects the supply line 20 to the corresponding trailer supply line. When the pressure sensor 56 indicates a loss of pressure, electronic control unit deactuates solenoid 54, thereby closing off the upstream portion 52 of supply line 20 and venting the downstream portion 48. Because of the loss of pressure in downstream portion 48 of trailer supply line 20, the pressure communicated to pilot pressure port 46 of valve 40 will also be exhausted, so that the valve 40 is switched to the position illustrated 5 in the drawing in which the upstream portion 42 of trailer control line 22 is shut off and the downstream portion 44 is vented. Accordingly, the tractor braking system is protected during trailer breakaway so that braking pressure is not continually vented through an open trailer supply or control line.

What is claimed is:

1. Fluid pressure braking system comprising a fluid pressure source, a supply line for supplying fluid pressure from said source to a portion of said system, a service line for supplying pressure signals to said portion of said system, said portion of said system including mechanically applied parking brakes released by fluid pressure communicated through said supply line and service brakes responsive to pressure signals for controlling a service brake application communicated through said service line, operator actuated control valve means for controlling communication through said service line and thereby communicating said pressure signals through the service line, first electrically actuated valve means for opening and closing communication through said supply line, first operator actuated switch means for controlling said first electrically actuated valve means, service line valve means for opening communication through said service line when communication through said supply line is open and closing communication through said service line when communication through said supply line is closed, said service line valve means including a pilot pressure inlet and being shifted between positions opening and closing communication through said service line by pilot pressure communicated through said pilot pressure inlet, said pilot pressure inlet being communicated to said supply line downstream of said electrically actuated valve means whereby said electrically actuated valve means controls communication of pilot pressure to said pilot pressure inlet, said system further including another portion including mechanically applied parking brakes released by fluid pressure, second electrically actuated valve means for controlling communication to said parking brakes of said another portion, and second operator-activated switch means for opening and closing said second electrically actuated valve means, said second electrically actuated valve means including a valve assembly having a pilot pressure inlet, said valve assembly being shifted between positions opening and closing communication to said last mentioned mechanically applied parking brakes by pilot pressure communicated through said pilot pressure inlet, said second electrically activated valve means further including an electrically actuated valve assembly operated by said second operator-actuated switch means for controlling communication of said pilot pressure to said pilot pressure inlet.

2. Fluid pressure braking system for a combination vehicle comprising a tractor portion and a trailer portion comprising a fluid pressure source carried by said tractor portion, a supply line for supplying fluid pressure from said source to said trailer portion of said system, a service line for supplying pressure signals to said trailer portion of said system, said trailer portion of said system including mechanically applied parking brakes released by fluid pressure communicated through said supply line and service brakes responsive to pressure signals communicated through said service line for effecting a service brake application, operator actuated valve means on said tractor portion for controlling communication through said service line and thereby communicating said pressure signals through the service line, first electrically actuated valve means carried by the tractor portion for opening and closing communication through said supply line, first operator actuated switch means for controlling said first electrically actuated valve means, service line valve means carried by the tractor portion for opening communication through said service line when communication through said supply line is open and closing communication through said service line when communication through said supply line is closed, said service line valve means including a pilot pressure inlet and being shifted between positions opening and closing communication through said service line by pilot pressure communicated through said pilot pressure inlet, the tractor portion of said system including mechanically applied parking brakes released by fluid pressure, second electrically activated valve means for controlling communication to said last mentioned parking brakes, and second operator-actuated switch means for opening and closing said second electrically actuated valve means, said second electrically actuated valve means including a valve assembly having a pilot pressure inlet, said valve assembly being shifted between positions opening and closing communication to said mechanically applied tractor portion parking brakes by pilot pressure communicated through said pilot pressure inlet, said second electrically actuated valve means further including an electrically actuated valve assembly operated by said switch means for controlling communication of said pilot pressure to said pilot pressure inlet.

* * * * *